United States Patent
Loomans

(10) Patent No.: US 6,728,960 B1
(45) Date of Patent: Apr. 27, 2004

(54) TECHNIQUES FOR MANAGING MULTIPLE THREADS IN A BROWSER ENVIRONMENT

(75) Inventor: Jeffrey Loomans, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

(21) Appl. No.: 09/437,421

(22) Filed: Nov. 17, 1999

Related U.S. Application Data
(60) Provisional application No. 60/109,077, filed on Nov. 18, 1998.

(51) Int. Cl.[7] .................................................. G06F 9/00
(52) U.S. Cl. ....................... 718/102; 709/203; 709/204; 709/205; 709/206
(58) Field of Search ........................ 709/102, 200–210, 709/310, 322; 707/526; 713/1; 718/102

(56) References Cited

U.S. PATENT DOCUMENTS

| | | | |
|---|---|---|---|
| 5,708,798 A | | 1/1998 | Lynch et al. |
| 5,745,765 A | | 4/1998 | Paseman |
| 5,825,651 A | | 10/1998 | Gupta et al. |
| 5,889,990 A | * | 3/1999 | Coleman et al. ............ 709/322 |
| 5,918,239 A | * | 6/1999 | Allen et al. ................. 707/526 |
| 6,128,640 A | * | 10/2000 | Klienman .................... 709/102 |
| 6,175,877 B1 | * | 1/2001 | Zerber ......................... 709/310 |
| 6,256,673 B1 | * | 7/2001 | Gayman ...................... 709/232 |
| 6,415,316 B1 | * | 7/2002 | Van Der Meer ............ 709/203 |
| 6,438,592 B1 | * | 8/2002 | Killian ........................ 709/224 |
| 6,516,338 B1 | * | 2/2003 | Landsman et al. .......... 709/203 |

FOREIGN PATENT DOCUMENTS

WO    WO 9939265    *    8/1999    ............. G06F/9/44

* cited by examiner

Primary Examiner—Meng-Al T. An
Assistant Examiner—Charles E Anya
(74) Attorney, Agent, or Firm—James W. Soong; Siebel Systems, Inc.

(57) ABSTRACT

Techniques for managing multiple threads in an asynchronous environment, such as a browser, are described. As a method, instantiating an event thread in response to a user event by a shell event handler block that provides shell functions for a user event. Once the event thread as been instantiated, managing the event thread by a generic thread manager block that provides a plurality of multithread management functions for the shell event handler. When required, blocking and unblocking the event thread by a blocking system that is arranged to block and unblock threads.

11 Claims, 7 Drawing Sheets

TECHNIQUES FOR MANAGING MULTIPLE THREADS IN A BROWSER ENVIRONMENT

CROSS REFERENCE TO RELATED APPLICATIONS

This application claims benefit of priority under 35 U.S.C. §119(e) of U.S. Provisional Application No. 60/109,077 filed Nov. 18, 1998, and entitled "Leveraging the Web: Architechture Matters" which is hereby incorporated by reference. This application is also related to co-pending U.S. Pat. No. 6,393,605 B1 issued May 21, 2002, and entitled "Apparatus and System for Efficient Delivery and Deployment of an Application" and co-pending U.S. Pat. No. 6,549,908, B1 entitled "Methods and Apparatus For Interpreting User Selections in the Context of a Relation Distributed as a Set of Orthogonalized Sub-Relations", filed simultaneously herewith, which is assigned to the assignee of the present application and is incorporated herein by reference in its entirety.

BACKGROUND OF THE INVENTION

1. Field of Invention

The invention relates generally to computer systems. More particularly, methods and apparatus for providing highly interactive, robust, and scalable on-demand network application delivery and execution capabilities in a distributed computer network are disclosed.

2. Description of Relevant Art

Generally speaking, a browser is an application program that provides a way to look at and interact with information on distributed computer networks such as the Internet. In particular, a Web browser is a client program that uses the Hypertext Transfer Protocol (HTTP) to make requests of Web servers throughout the Internet on behalf of the browser user. One of the most recent uses of browsers is in the realm of electronic (e-) commerce in which any number of client side users (i.e. "e-customers") interact in a real time basis with any number of server side processors (i.e., "e-sellers") over the Internet. In order to transact business in a Web-based environment, browsers typically execute Web commerce applications specifically designed to facilitate e-commerce transactions such as requesting quotes, selecting options and assembling components into complex bundles, and placing orders.

In this regard, successful Web commerce applications must be capable of automating a customer through the entire buying cycle, from initial inspection to final purchase and shipping, in addition to providing the customer all relevant information required to make a buying decision and providing customer guidance. As the complexity of the buying cycle and/or the purchases themselves increases—for instance, from buying office supplies to buying mainframe computers—a general purpose Web commerce application must scale its ability to manage this complexity. In order to accomplish this, a general purpose Web commerce application must be: 1) fast loading and highly responsive in "click over click" type scenarios in order to support highly interactive customer sessions such that a buyer can input any and all relevant information quickly and with apparently little or no delay in application response; 2) powerful in its ability to process relevant data from a broad range of possible choices, configurations, and problem domains quickly—in other words, a general purpose Web commerce application should have the flexibility and computational power of a conventional programming language; 3) the application must be robust in that it can run on a wide variety of client machines while maintaining greater than 99% up time, and finally; 4) the Web commerce application must be highly scalable given the unpredictable and potentially large number of buyers who may simultaneously access the application online.

Conventional attempts to construct general purpose e-commerce application include embedded client-side applications: Java applets, or ActiveX controls. As a class, these are generally small programs that can be sent along with a Web page to a browser to execute interactive animations, immediate calculations, or other simple tasks using the computing resources of the client without having to send a request back for processing on the server. As an example, as shown in FIG. 1, a distributed computer system 100 includes a client computer 102 that is coupled to a server (host) computer 104. The computer 102 includes a browser application 106 that, in turn, includes a requested Web page 108 having an applet 110 embedded therein capable of performing various tasks. In most situations, the applet 110 is executed by a Java Virtual Machine (JVM) 112 that in this example is also resident in the browser 106.

In order for the JVM 112 to execute the applet 110 the applet's requisite component files (such as ".class files", images and sounds), represented by files 114–118, must be downloaded from the server 104 to the JVM 112. Typically the server 104 is part of a distributed network of computers, such as the Internet, or in some cases could be part of an intranet. In any case, the files 114–118 that are required for the JVM 112 to run the applet 110 include Java class files as well as resource files that are used to support the execution of the applet 110. Such class files include a main class file, main class 114, that is used by the JVM 112 as an entry point for execution of the applet 110. The server 104 also stores other class files such as b.class 116 that are used by the JVM 112 in the furtherance of executing the applet 110. Various image and sound components used in the execution of the applet 110 are stored in resource files such as c.image 118.

In order for the JVM 112 to execute the applet 110, it may be required to download some of the class and resource files as needed. This is typically accomplished by sending a file request that takes the form of an HTTP request to the server 104 which responds by providing the requested file. By way of example, the JVM 112 issues a request to retrieve the main class file main.class 114 to which the server 104 responds by sending (i.e., downloading) the requested file (i.e., main.class 114). This request/response procedure is followed for every file for which the JVM 112 requires to execute the applet 110.

As can be readily appreciated, the Java applet approach is not highly interactive since in general it may require a substantial amount of time to download the JVM and will require time to download needed class files before the applet can even initiate. In addition, no particular provision is made to segment application specific applet code as problem complexity grows. Thus, the larger and more complex the e-commerce problem, the larger and slower the initial download prior to user interaction. Finally, since there are a large variety of JVMs and class files available, and since Java is unstable on many client machines, making a Java based applet robust across all or even most users would require many hundreds of thousands of bytes to be downloaded across the Internet. These large data transfers would be counterproductive to producing the highly interactive experience desired by the e-customer. Therefore, in order to improve the interactivity of the applet (by reducing the size of the data transfers), the robustness of the applet would be adversely affected since some platforms would not be effectively serviced.

Another conventional approach to delivering general purpose e-commerce applications is referred to as server side processing. In server side processing, all application processing is performed on the server and does not use the computer resources of the client. In this way, the problems related to initial load time and robustness are solved. However, this comes at the cost of interactivity since the servers are physically separated from the clients in a distributed network of computers such as the Internet. Even with the advent of broadband access, the performance of a server side application will always be generally slower than an equivalent client side application simply because each interaction, processing, and response cycle requires the physical transfer of requests across a network that is subject to congestion, transfer failure, and communication overhead.

In addition to speed considerations, it is difficult to find a general solution to scaling the server side facility since every time a new user is added, additional processing capabilities must be provided by the server. In the general access environment of the Internet, unpredictable end-user demand can cause sudden usage spikes, or can simply grow to overwhelm available server resources. Finally, since thousands of even millions of clients share the same network of server side processing resources, errors in or changes to the application run the very real risk of simultaneously shutting out all users, causing potentially large losses of time and revenues. Generally, a client side solution can avoid these problems by distributing processing out to each client's machine.

Finally, it is in principle possible to develop and deliver to each end user's machine code that is custom written for the particular combination of browser, platform, and e-commerce application. However, this is not a general purpose solution, as it cannot realistically be expected that the many millions of e-commerce applications running on their respective browsers can be truly customized within a reasonable length of time.

In addition to the above described shortcomings of the conventional approaches to delivering general purpose e-commerce application, asynchronous loading of data and code segments requires that any generic application engine must provide a generic layer for management of thread states and signaling of initiation and termination.

Since conventional browsers do not provide the requisite thread management routines, therefore, what is desired are techniques for providing reentrant threading in an asynchronous environment, such as that of a browser.

SUMMARY OF THE INVENTION

Techniques for managing multiple threads in an asynchronous environment, such as a browser, are described. In one embodiment of the invention, a method is disclosed. An event thread is instantiated in response to a user event by a shell event handler block that provides shell functions for a user event. Once the event thread has been instantiated, the event thread is managed by a generic thread manager block that provides a plurality of multithread management functions for the shell event handler. When required, the event thread is blocked or unblocked by a blocking system that is arranged to block and unblock threads.

In another embodiment, a computer program product for managing multiple threads in a browser program executing on a client platform is disclosed. The computer program product includes computer code that instantiates an event thread in response to a user event by a shell event handler block that provides shell functions for a user event and computer code that manages the event thread by a generic thread manager block that provides a plurality of multithread management functions for the shell event handler. The computer program product further includes computer code that blocks and unblocks the event thread when required. In a preferred embodiment, the computer code is stored in a computer readable medium.

In yet another embodiment, an apparatus for managing multiple threads in a browser program executing on a client platform is disclosed. The apparatus includes software means for instantiating an event thread in response to a user event by a shell event handler block that provides shell functions for a user event and software means for managing the event thread by a generic thread manager block that provides a plurality of multithread management functions for the shell event handler. The apparatus also includes software means for blocking and unblocking the event thread when required.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Figure 1:
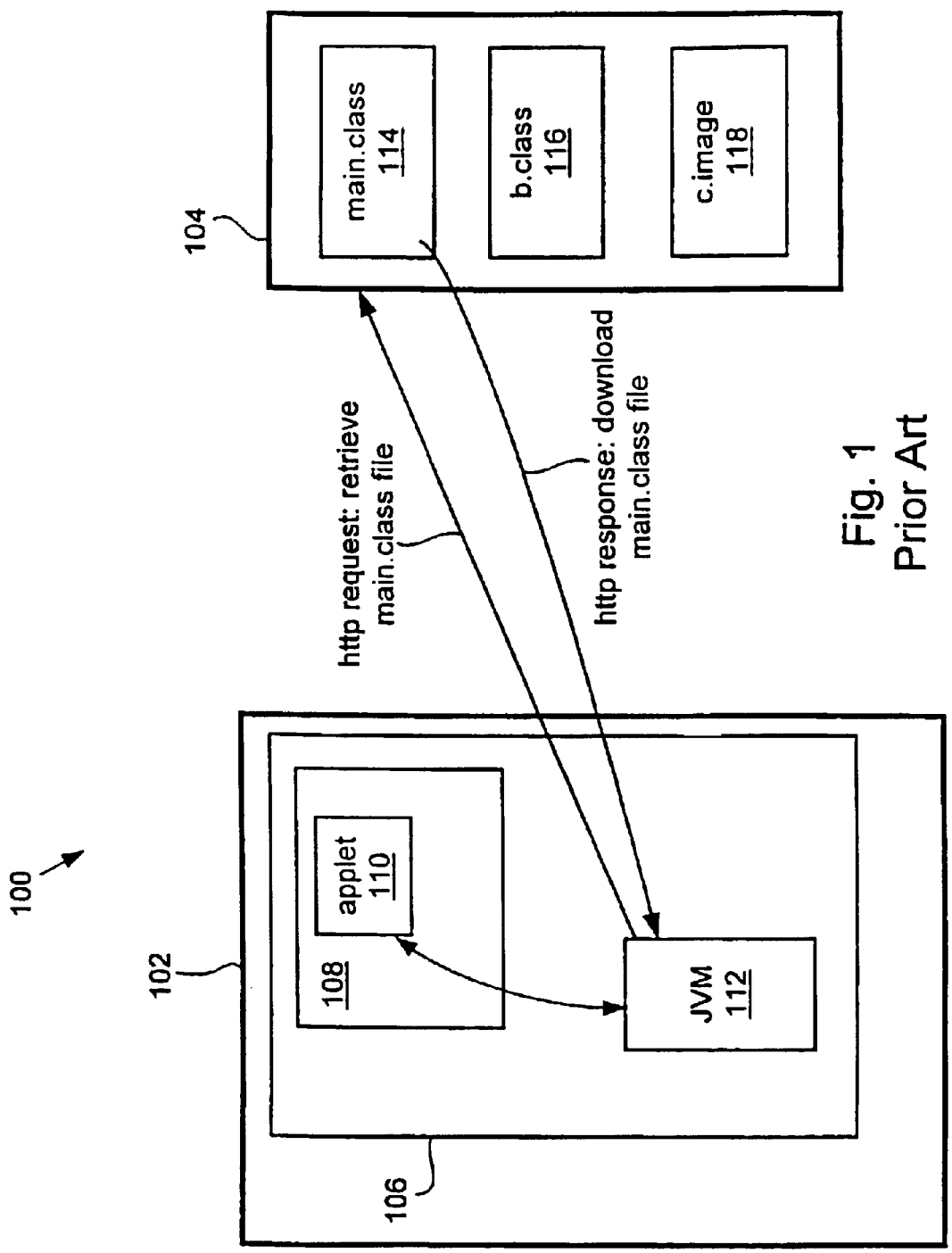
FIG. 1 shows a conventional distributed computer system capable of supporting a Java based applet browser/server configuration.

In the following description, frameworks and methods of providing an apparatus and system for efficient delivery and deployment of an application within, for example, a browser/server environment are described. Although the invention will initially be described in terms of a multithreaded, object oriented computing system implemented using HTTP requests and responses, it should be noted that the present invention can be used in any system that is capable of handling well defined requests and responses across a distributed network.

It should be noted that although the invention is described in terms of the Internet, any distributed network can be suitably employed to implement any desired embodiment of the invention. It is one of the advantages of the invention that it is well suited for low bandwidth systems capable of executing client side applications. Such low bandwidth systems include, but are not limited to: virtual private networks direct serial connections across telephone lines ("BBS systems"), and LANs and WANs regardless of network protocol.

When implemented in a network using the HTTP protocol, such as the Internet, when an end user (i.e., client) desires to run an application within a browser environment, the end user generates an HTTP request for a resource identified by a URL (universal resource locator). In one implementation, this request is transmitted by way of a distributed network, such as the Internet, to a server computer.

In response to the URL, the server computer provides an HTTP response in the form of an HTML page generally consisting of the "expected" interface page and an embedded application engine kernel. In a preferred embodiment, the web page is an HTML frameset that transparently contains the expected interface page(s) in one frame, and the engine kernel frameset in another. The kernel is the minimum subset of components required to process and display the initial expected interface pages once loaded. In general, the kernel undergoes bootstrapping in that it initially loads in only enough of itself sufficient to load the next larger kernel set, which, in turn, has the capacity to load additional components, and so forth until all components that are required for initial processing of user requests are present. Typically, the kernel includes, for example, Javascript code to provide basic thread management functions. These include, but are not limited to, event handling routines, blocking functions, structures (such as frames) within which application components such as data and additional code may be loaded later, if required. Typically, the initial kernel components also include initialization sections and sections allowing the loading of additional engine components not required at startup.

Concurrently with the kernel bootstrapping, the application shell page loads initial GUI components and data components. Once all required load time components are available, the application engine can then proceed in processing user supplied inputs in the particularized context of the received data and any API extension code during what is referred to as a sub-application. In the described embodiment, results of the particularized processing are then displayed (if required) using, for example, additional HTML pages. It should be noted that in almost all cases, a user session will consist of a series of different sub-applications as, for example, a user navigates the application interface and interacts with the different sections each with its own particularized UI and data. When a new sub-application is required, during what is referred to as a "demand load", the kernel's thread manager oversees the asynchronous accessing and loading of the sub-application's additional UI and data files by the browser, and potentially the asynchronous accessing and loading of additional engine code components. It is important to note that the thread manager must be capable of "blocking", or pausing execution of the application, while monitoring the multiple processes loading in new components, and restarting or "unblocking" the application when all are complete.

It is during such asynchronous demand loads in a multi-threaded environment that various thread management schemes are provided by the kernel, as the browser itself provides neither support for multiple processes, nor for management of concurrent threads. In contrast to conventional browser configurations, this independence of kernel from browser enables the inventive kernel to provide multi-thread management so as to be capable of supporting concurrent thread execution in a browser environment.

Using the inventive application engine and deployment methods, therefore, regardless of the particularized UI and data required for a given application, only the minimal set of required components is ever loaded onto the client, and all processing of user inputs and calculation results is carried out on the client platform without resorting to server side processing. As a generic solution, the invention thereby assures the highest possible interactivity in a distributed network environment as well as significant scaling advantages, as all processing resources are provided by the client.

Furthermore, the generic engine is independent of both browser and platform, and of particularized components required by any given application, so robustness across the breadth of client systems and the power to handle even complex problems is provided without requiring, for example, customized coding.

The invention will now be described in terms of a browser resident in a client computer that is typically used to execute a highly interactive e-commerce application. It should be noted, however, that any applications requiring data processing in a highly interactive environment can also be implemented using the invention, and the invention therefore should not be construed as being limited to e-commerce applications. It should also be noted, that the invention is well suited for any low bandwidth system in which user interactivity is a prime consideration.

Figure 2:
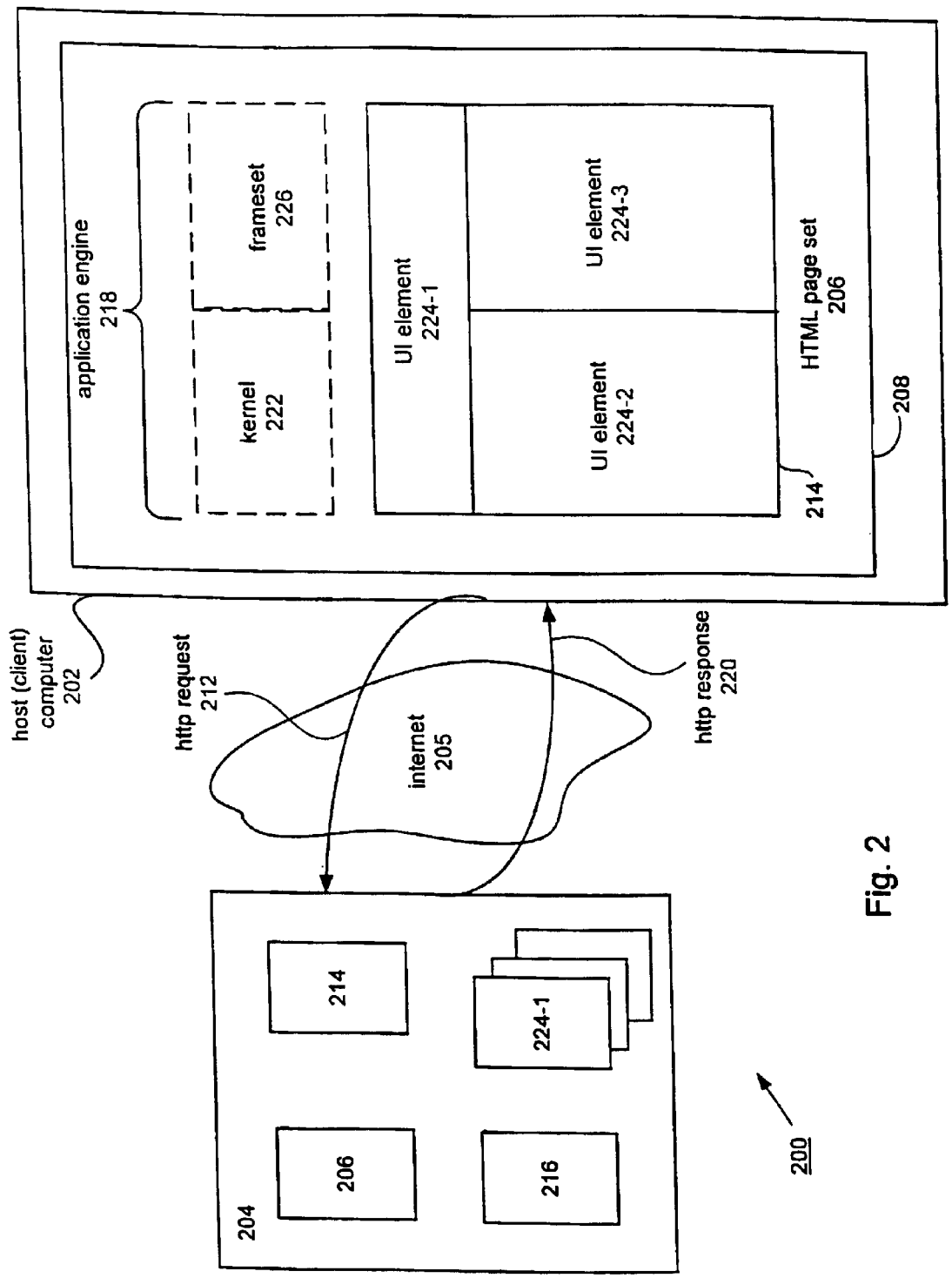
FIG. 2 shows a browser/server system in accordance with an embodiment of the invention.

Referring now to FIG. 2, a browser/server system 200 in accordance with an embodiment of the invention is shown. The system 200 includes a client computer 202 coupled to a server (host) computer 204. Typically, the host computer 204 is part of a distributed interconnected computer network 205 such as the Internet, but can also be part of a private wide or local area network (WAN/LAN) utilizing HTTP protocols, sometimes referred to as an intranet. It is one of the advantages of the invention that the interconnected computer network can be any low bandwidth system.

In order to facilitate communication between the various users and/or computers that form the network 205, the client computer 202 utilizes the graphical user interface resources presented by a Web page (sometimes referred to as an HTML page) 206 resident in a browser 208, most of which are obtained by various HTTP requests. When a user desires to download a particular HTML page 206 from the server 204, the browser 208 generates an HTTP request 212. The URL for the requested page 206 includes information related both to the location of the server computer 204, and to the location within the server computer 204 where the page 206 is located.

In contrast to conventionally configured HTML pages, the particular "shell" HTML page 206 is a frameset formed of a visible HTML page 214 and an associated frameset 216 that acts as a loader causing all components of the application engine to download to the browser 208 by way of an HTTP response 220.

In the described embodiment, the frameset 216 defines an application engine 218 to include all required loadtime components that are ultimately incorporated into the browser 208 as a kernel 222. As initially loaded, the kernel 222 is a primitive kernel that determines the browser class of the browser 208. In the described embodiment, the kernel 222 is formed of code that is generally script embedded in HTML, such as Javascript or VB script. As is well known by those skilled in the art, since each browser belongs to a particular browser class, each of which can execute this code differently, it is important to quickly determine the particular browser class to which the browser 208 belongs. In this way, the primitive kernel can replace itself with a browser specific kernel in the form of the kernel 222. Thereafter, kernel 222 will be responsible for loading additional components required during a particular user session.

It should be noted that the kernel 222 includes that code required to provide thread management functions such as event handling and thread blocking, and appropriately configured data structures and frames that will contain additional code and data components. For example, in some implementations, the kernel 222 initiates and monitors load-time threads that are used, for example, to specify those user interface (UI) files are to be loaded to form various UI interface elements 224-1 through 224-3. It should be noted that the application engine 218 interprets which files which will be loaded for the associated application, or appropriate sub-application, as well as how data will be used to fill in each of the particular UI interface elements 224-1 through 224-3. For all subsequent demand-loads of sub-applications, the kernel 222 included in the application engine 218 provides all necessary and appropriate event handler routines in order to properly manage concurrent asynchronous threaded operations, such as demand loading of additional application engine components and data components.

Figure 3:
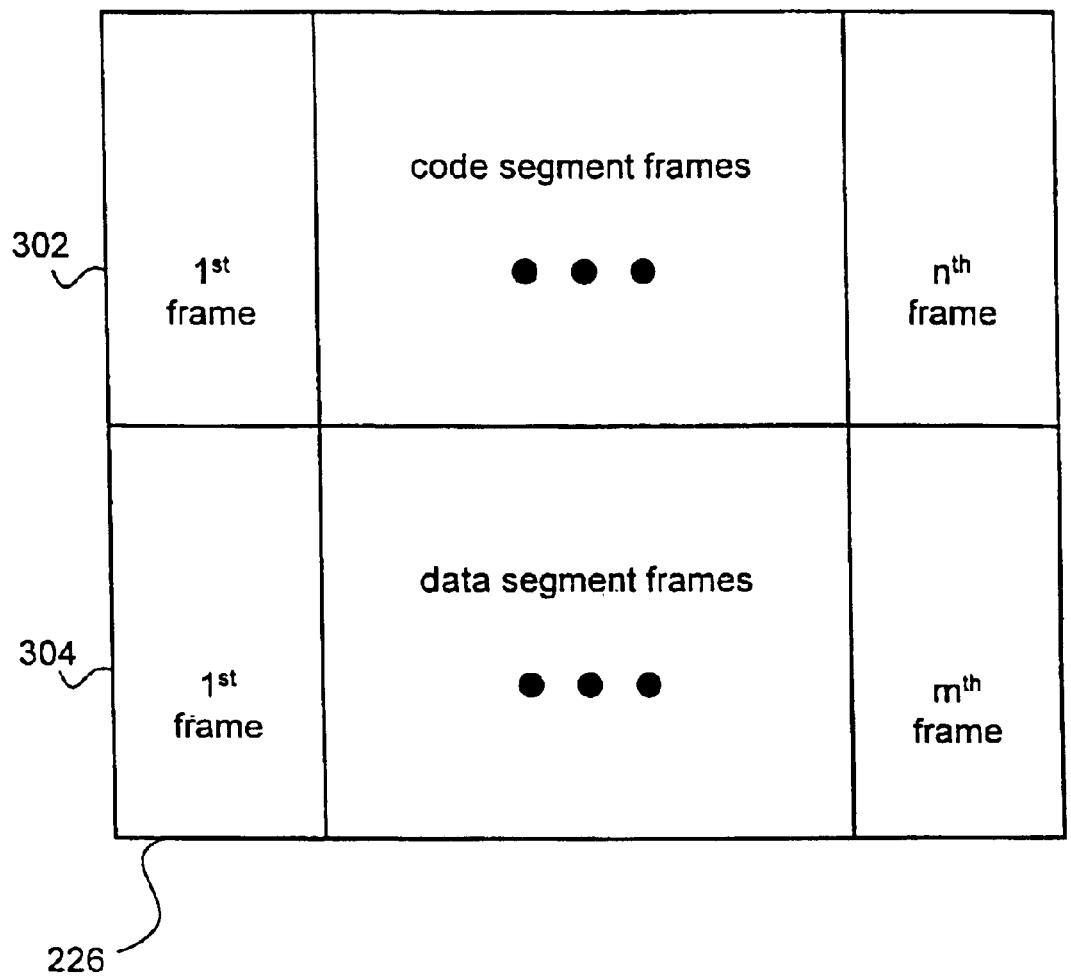
FIG. 3 shows one implementation of a hidden frameset in accordance with an embodiment of the invention.

In the described embodiment, the code and data segments loaded by the kernel 222 are stored in what is referred to as a hidden frameset 226 (hidden since the user cannot "see" the results of these loads as visible HTML pages). One implementation of the hidden frameset 226 in accordance with an embodiment of the invention is shown in FIG. 3. In the implementation shown, the frame structure 226 includes n generic engine code segment frames 302 and m application specific data segment frames 304 that are each logically and physically separate from one another and from the browser 208. It is important to note that for a particular application the n generic engine segment frames 302 are "locked" in that once loaded each of the particular n code segments cannot be modified or replaced. However, as one might expect, the m application specific frames 304 can be updated as necessary. This provides a standard, generic engine reference environment across all particular applications.

Referring back to FIG. 2, once loaded, the kernel 222 included in the application engine 218 performs a bootstrap operation by running any required initialization routines as well as concurrently retrieving any further application engine components known to be required at startup. Once the initialization routines have been successfully completed, the application engine 218 is ready to begin processing user inputs via selected ones of the interface pages 224-1 through 224-3 in the particularized context of the data components in the frameset 226 and displaying, where appropriate, the result(s) in additional HTML pages generally in the visible frame 214.

Figure 4:
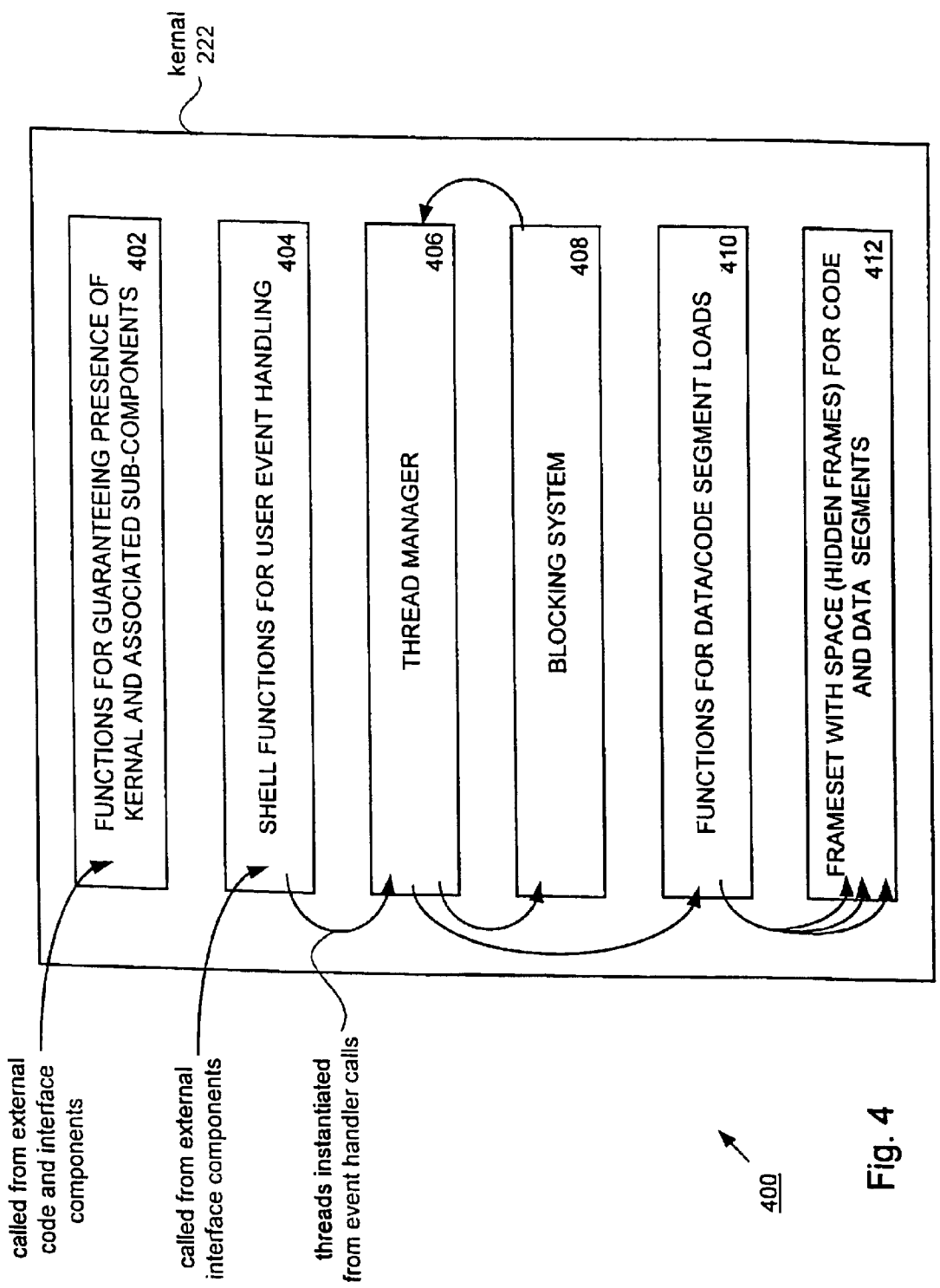
FIG. 4 shows one implementation of an application engine kernel in the form of a block diagram is shown in accordance with an embodiment of the invention.

Referring now to FIG. 4, one implementation of the kernel 222 in the form of a block diagram is shown in accordance with an embodiment of the invention. In the described embodiment, the kernel 222 includes a function block 402 that enhances the robustness of the application by providing primitive functions that guarantee the presence of the kernel 222 and associated application engine components in frameset 226. Typically, the function block 402 is called from engine code segments and interface components both to centralize demand loads of missing components and to handle cases of incorrect or missing components. Another function block 404 called from external interface components (such as, for example, API calls) provides shell functions for user event handling. It is important to note that the kernel, and more importantly, the shell event handlers included in the kernel are logically separate and distinct both from the browser 208 and from the particular sub-application routines in the frameset 226 called from the shell routines.

It is important to have independent shell event handlers in the kernel since in the absence of browser provided thread management routines, a generic application engine must provide a generic layer for management of thread states and signaling of initiation and termination. In this way, thread manager block 406 provides various thread management functions for general shell event handlers. These handlers can then, in turn, call application specific handlers for particularized application data without having to custom develop thread management code for each particularized application.

Figure 5:
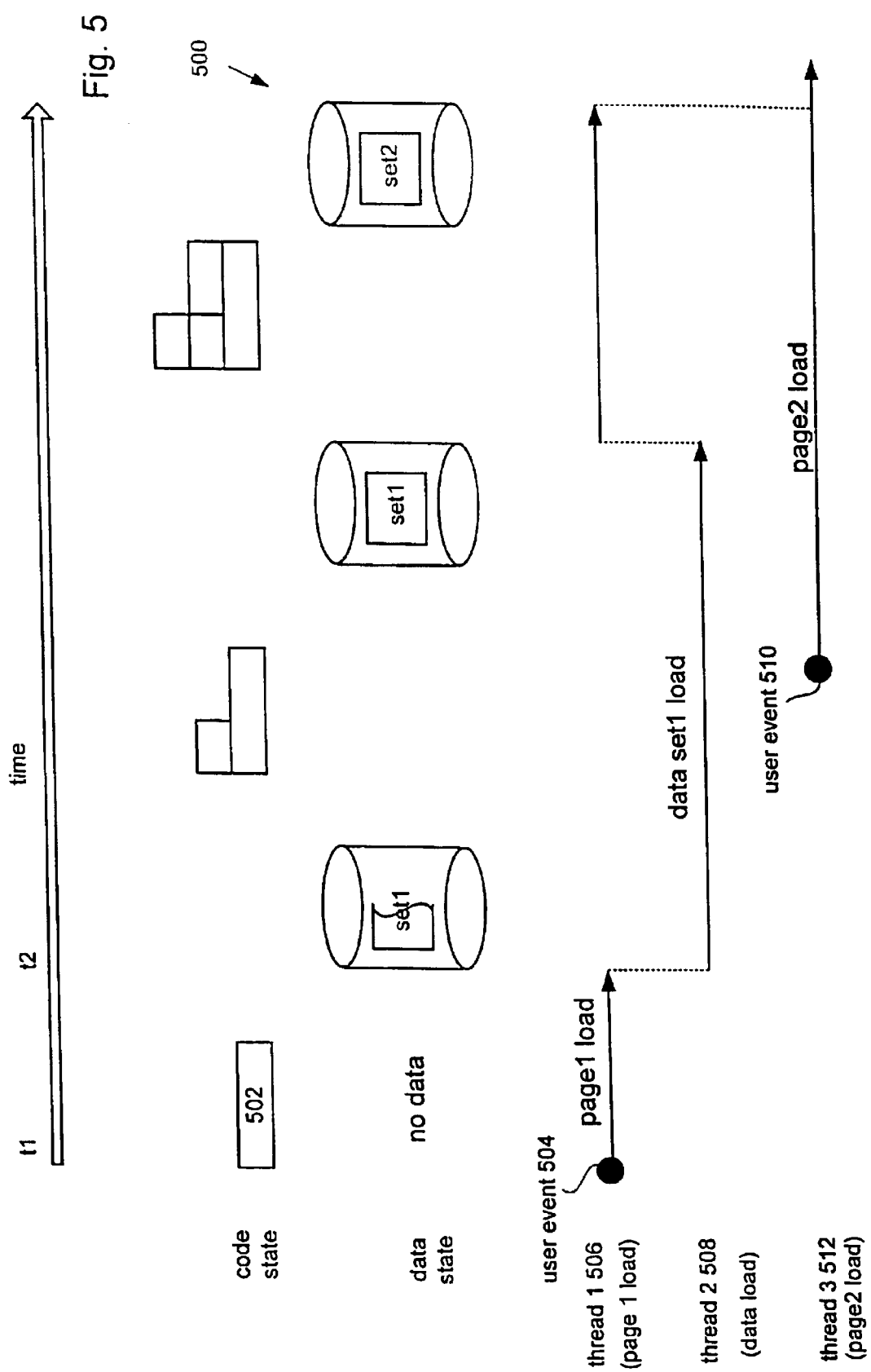
FIG. 5 shows a timing diagram illustrating an application engine asynchronously loading both code and data segments in accordance with an embodiment of the invention.

For an example of the general process of managing multiple threads of execution and loading sub-applications, refer to FIG. 5 which is a timing diagram 500 illustrating an application engine asynchronously loading both code and data segments in accordance with an embodiment of the invention. As shown in FIG. 5, at an initial time $t_o$, code segment 502 has been loaded by the kernel 222 prior to a user event 504 such as clicking or unclicking a UI element (for instance, a button or other such element). This user event causes the event handler block 404 to instantiate a page1 load thread 506. At a subsequent time $t_2$, a data load thread 508 is recognized to be required for continuation of page load 506 and is instantiated by the event handler block 404 such that an asynchronous download of data set1 commences. Concurrently, the thread manager block 406 determines that the page1 load thread 506 must be blocked from further execution until the data needed from the load thread 508 has completed loading the data set1. In order to block the page1 load thread 506, a blocking system 408 blocks the execution of the page1 load thread 506 until such time as the load under thread 508 is determined to be completed. Once the downloading is complete, the blocking system 408 terminates the data load thread 508 and restarts the page1 load thread 506.

The need for reentrant threading in an asynchronous environment, such as that of a browser, can next be seen in the final part of FIG. 5. In some cases, a user event 510 occurring during thread 508 causes the event handler block 404 to instantiate a page 2 load thread 512 which, for example, would replace page 1 and obviate its further execution. In this case, it is important for thread 512 to be able to execute concurrently with thread 506 and signal the termination of the data load thread 508 indicating that the download of the data set1 is complete.

Figure 6:
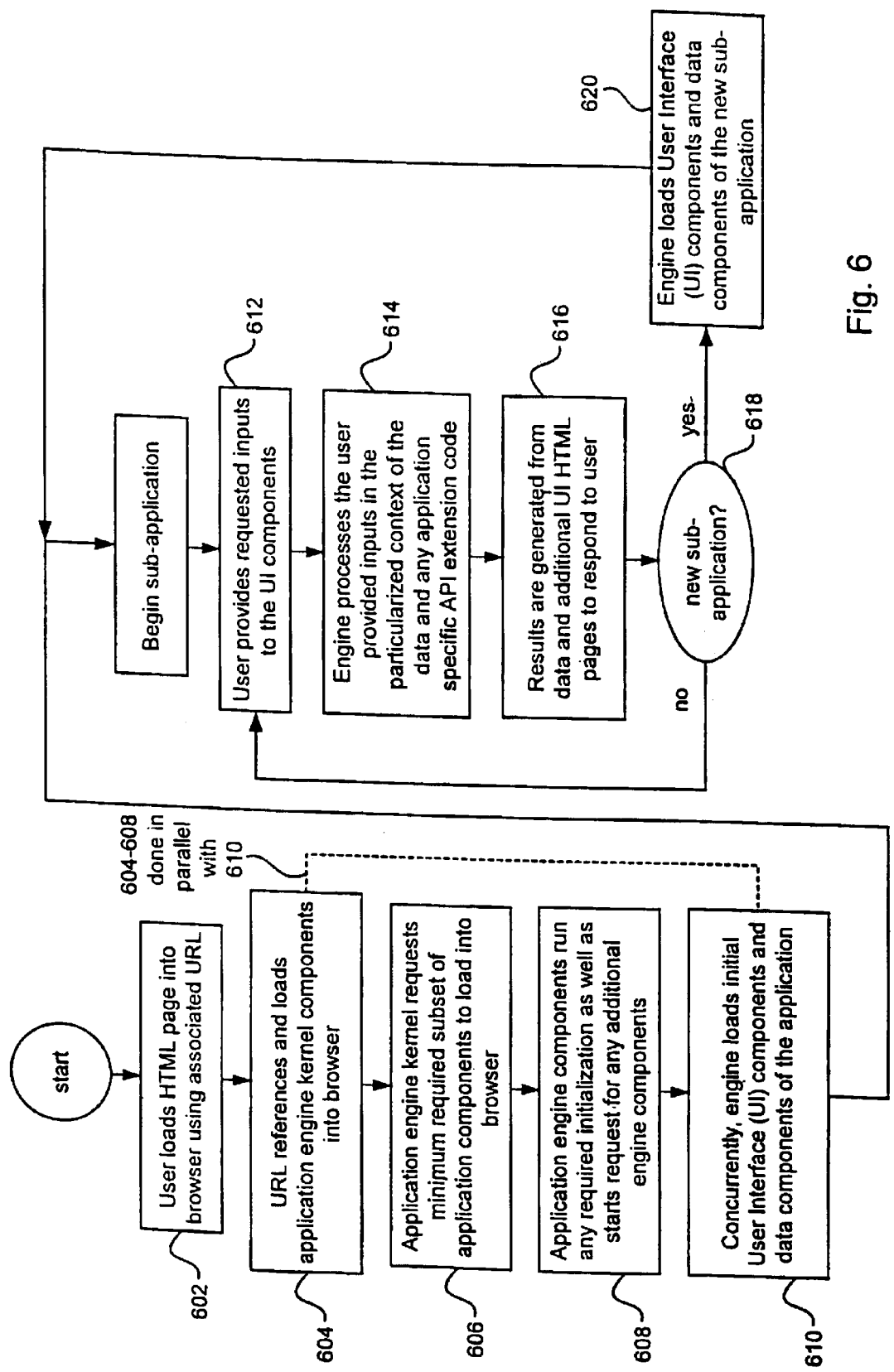
FIG. 6 shows a flowchart detailing a process for delivering and deploying an application in a browser in accordance with an embodiment of the invention.

FIG. 6 illustrates a flowchart detailing a process 600 for delivering and deploying an application in a browser in accordance with an embodiment of the invention. The process 600 begins at 602 with a user loading the application engine shell page into a browser using an associated URL. At 604, URL references within the frameset initiate loading of the kernel into the browser. At 606, the kernel, in turn, requests a minimum required subset of application components to load into the browser; these are the components that will be required for the user to proceed at the first page. Once loaded, the application engine kernel runs any required initialization routines and initiates loading of any additional application engine components that are not required at starttime at 608. Concurrently with the bootstrapping process in 604–608, the application engine shell page loads initial User Interface (UI) components and data components associated with the initial sub-application to be deployed at 610. At some time thereafter at 612, the user provides requested inputs to the displayed UI components that the application engine processes at 614 in the particularized context of the sub-application's data and any API extension code. At 616, the corresponding results are generated from the data and displayed in additional HTML in response to the user-supplied inputs. At 618, a determination is made whether or not a new sub-application is to be processed. If there are no additional sub-applications to process the application simply waits for the next user input in the current sub-application. However, if there are additional sub applications to process, control is passed to 620 where the additional components are loaded and control is then passed back to 612.

Figure 7:
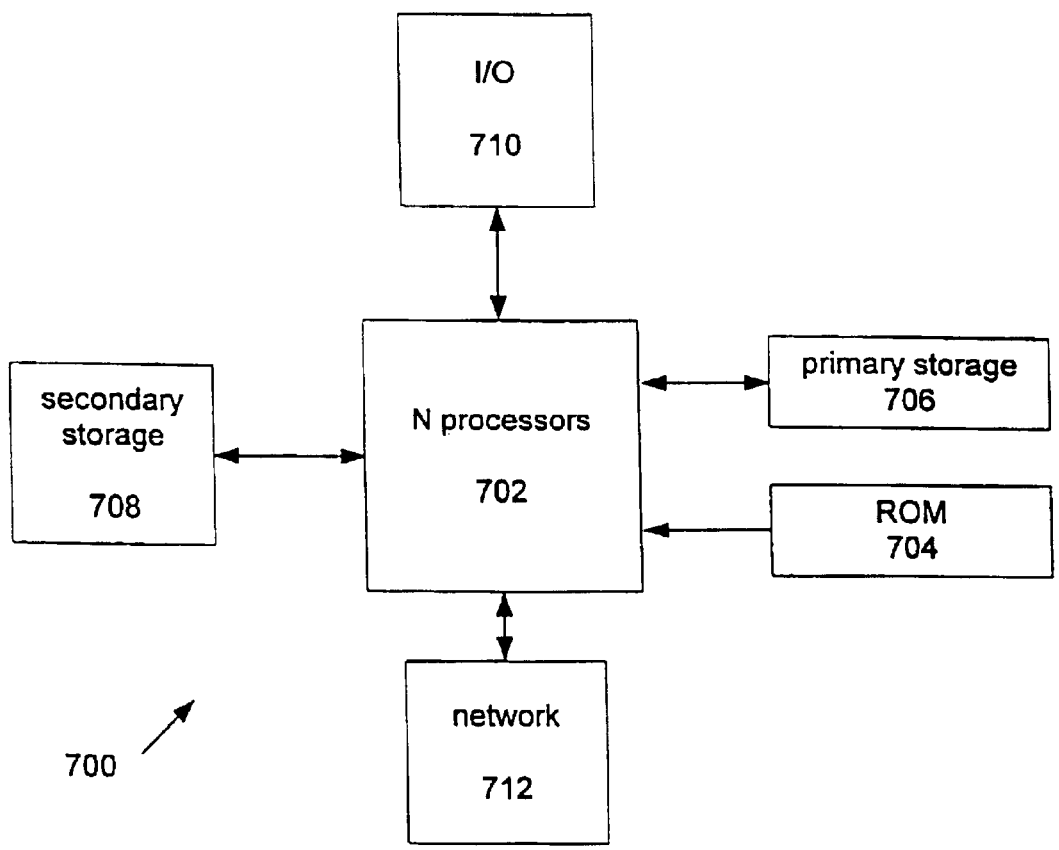
FIG. 7 illustrates a computer system that can be employed to implement the present invention

FIG. 7 illustrates a computer system 700 that can be employed to implement the present invention. The computer system 700 or, more specifically, CPUs 702, may be arranged to support a virtual machine, as will be appreciated by those skilled in the art. As is well known in the art, ROM acts to transfer data and instructions uni-directionally to the CPUs 702, while RAM is used typically to transfer data and instructions in a bi-directional manner. CPUs 702 may generally include any number of processors. Both primary storage devices 704, 706 may include any suitable computer-readable media. A secondary storage medium 708, which is typically a mass memory device, is also coupled bi-directionally to CPUs 702 and provides additional data storage capacity. The mass memory device 708 is a computer-readable medium that may be used to store programs including computer code, data, and the like. Typically, mass memory device 708 is a storage medium such as a hard disk or a tape which generally slower than primary storage devices 704, 706. Mass memory storage device 708 may take the form of a magnetic or paper tape reader or some other well-known device. It will be appreciated that the information retained within the mass memory device 708, may, in appropriate cases, be incorporated in standard fashion as part of RAM 706 as virtual memory. A specific primary storage device 704 such as a CD-ROM may also pass data uni-directionally to the CPUs 702.

CPUs 702 are also coupled to one or more input/output devices 710 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 702 optionally may be coupled to a computer or telecommunications network, e.g., an Internet network or an intranet network, using a network connection as shown generally at 712. With such a network connection, it is contemplated that the CPUs 702 might receive information from the network, or might output information to the network in the course of performing the above-described method steps. Such information, which is often represented as a sequence of instructions to be executed using CPUs 702, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention.

Although the methods of managing threads in accordance with the present invention are particularly suitable for implementation in browser environments, the methods may generally be applied in any suitable low bandwidth or high bandwidth system. In particular, the methods are suitable for use in digital appliances, low bandwidth networks. Such low bandwidth systems include, but are not limited to: virtual private networks direct serial connections across telephone lines ("BBS systems"), and LANs and WANs regardless of network protocol.

While the present invention has been described as being used with a computer system that has an associated web browser and web server, it should be appreciated that the present invention may generally be implemented on any suitable computer system. Therefore, the present examples are to be considered as illustrative and not restrictive, and the invention is not to be limited to the details given herein, but may be modified within the scope of the appended claims along with their full scope of equivalents.

What is claimed is:

1. A method comprising:

loading initial content into a browser running on a client connected to a distributed network, said initial content including an application engine kernel logically distinct from the browser, the application engine kernel containing a minimum set of components to process and display the initial content including a thread management component and a blocking component for selectively blocking execution of a thread corresponding to a sub-application;

managing loading of application content over the distributed network into the browser via the application engine kernel, the application content including at least one sub-application including a user-interface (UI) and data, said thread management component managing asynchronous loading of the UI and data into the browser via concurrent execution of a plurality of threads corresponding to said at least one sub-application;

receiving a first user supplied event;

instantiating a first page load thread in response to the user supplied event to commence loading a first page;

instantiating a data load thread to commence loading a first data set associated with the first page;

blocking the first page load thread until the first data load has been completed;

terminating the first data load thread when the first data load is completed; and unblocking the first page load thread to enable continued loading of the first page.

2. The method of claim 1, wherein said initial content comprises a Web page in which at least a portion of the application engine kernel is embedded.

3. The method of claim 2, wherein the Web page includes a visible frameset and an associated frameset that operates as a loader to cause the application engine kernel to be loaded into the browser.

4. The method of claim 1, wherein the application engine kernel provides user event handling operations, whereby the application engine kernel selectively executes a thread corresponding to least one of a code or data segment pertaining to the application content in response to a corresponding user event.

5. The method of claim 4, wherein at least two threads pertaining to the application content are executed concurrently.

6. The method of claim 1, wherein the application engine kernel is loaded into the browser by loading initial portion comprising one or more components from which the application engine kernel may be bootstrapped, bootstrapping said initial portion and subsequently loading additional application engine kernel components via application engine kernel components that have been previously loaded.

7. The method of claim 6, wherein the initial portion of the application engine kernel comprises generic code that may be loaded by a variety of different types of browsers, the method further including:

identifying a particular type of browser running on the client; and loading additional application kernel components specific to the type of browser that is identified.

8. The method of claim 1, further comprising:

receiving a second user supplied event during loading of the first data set; and instantiating a second page load thread in response to the second user event, wherein the second page load thread executes concurrently with the first page load thread.

9. A computer readable medium having code stored thereon comprising an application engine kernel logically distinct from a browser, the application engine kernel containing a minimum set of components to process and display application content, which when loaded into the browser and executed performs operations including:

loading initial content into a browser running on a client connected to a distributed network, said initial content including an application engine kernel, the application engine kernel containing a minimum set of components to process and display the initial content including a thread management component and a blocking component for selectively blocking execution of a thread corresponding to a sub-application;

managing loading of application content over the distributed network into the browser via the application engine kernel, the application content including at least one sub-application including a user-interface (UI) and data, said thread management component managing asynchronous loading of the UI and data into the browser via concurrent execution of a plurality of threads corresponding to said at least one sub-application;

receiving a first user supplied event;

instantiating a first page load thread in response to the user supplied event to commence loading a first page;

instantiating a data load thread to commence loading a first data set associated with the first page;

blocking the first page load thread until the first data load has been completed;

terminating the first data load thread when the first data load is completed; and unblocking the first page load thread to enable continued loading of the first page.

10. The computer readable medium of claim 9, wherein the execution of the application threads comprises asynchronous instantiation of a plurality of application threads.

11. The computer readable medium of claim 9, wherein the computer readable medium comprises a Web page transmitted over the distributed network as a carrier wave, said Web page including embedded code comprising the application engine kernel.

* * * * *